Feb. 16, 1932. M. MARTHINSEN 1,845,924
VEHICLE ANTISKID DEVICE
Filed Feb. 4, 1929
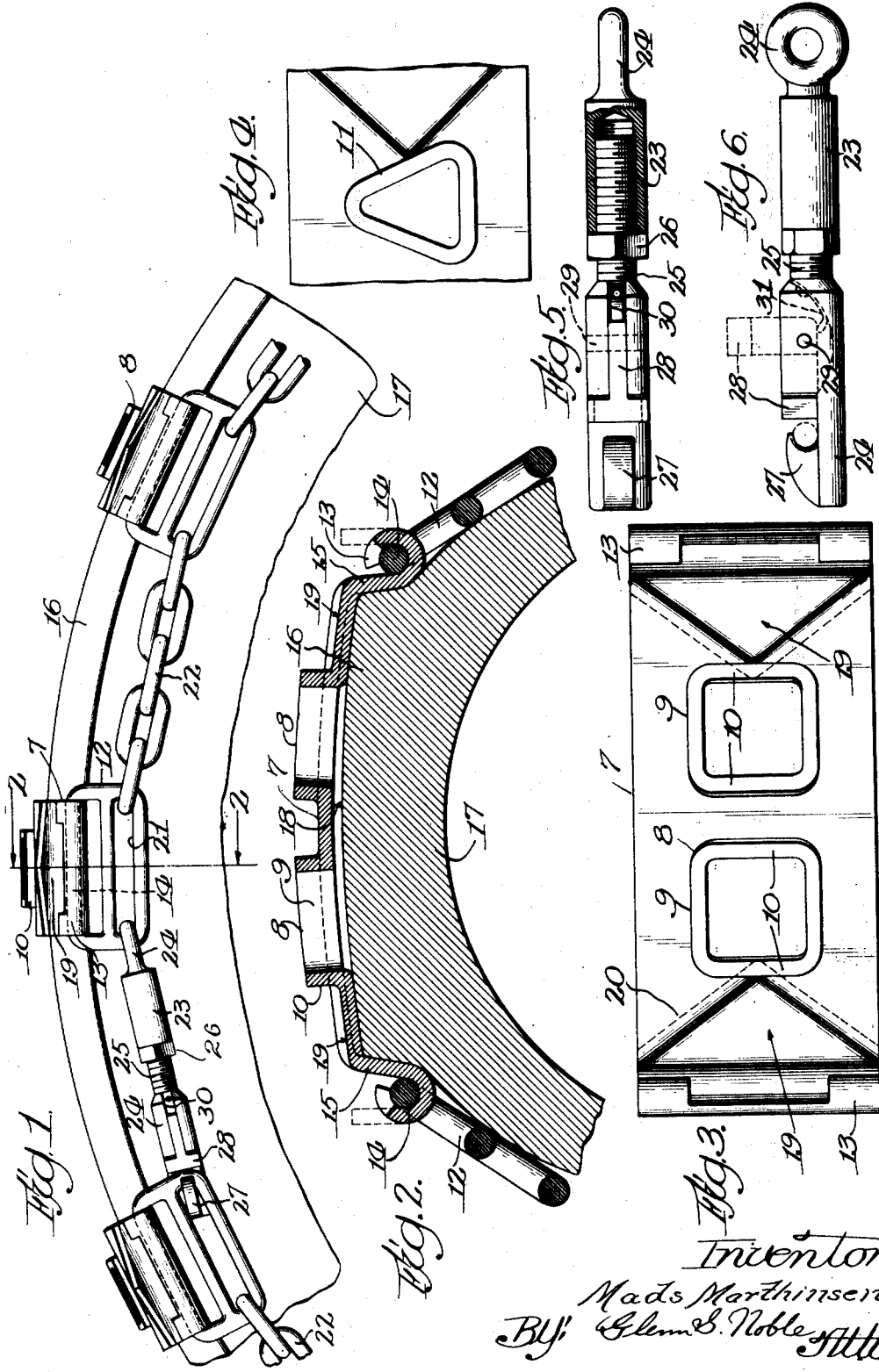

Patented Feb. 16, 1932

1,845,924

UNITED STATES PATENT OFFICE

MADS MARTHINSEN, OF MICHIGAN CITY, INDIANA

VEHICLE ANTISKID DEVICE

Application filed February 4, 1929. Serial No. 337,410.

This invention relates to anti-skid or non-slipping devices for tires and to means for securely applying the same thereto. While various expedients such as chains or the like have heretofore been proposed for such purposes, most of such devices have not proven successful to prevent slipping or skidding on ice, and the present invention is particularly directed to devices which will prevent the wheels from skidding on slippery surfaces such as ice or the like.

The objects of this invention are to provide a novel chain for tires having road contact members or grippers which will be particularly efficient in preventing skidding or slipping on ice or the like; to provide an improved anti-skid device having novel projections for engagement with the road; to provide devices of this character which will fit on pneumatic tires having shouldered treads; and to provide chains having novel fastening and adjusting means for holding said non-skid devices on the tires. Other objects and advantages will also appear from the following description taken in connection with the accompanying drawings in which Figure 1 is a side view of a portion of a tire with my improved gripper chain applied thereto;

Figure 2 is an enlarged cross sectional view taken on the line 2—2 of Figure 1;

Figure 3 is a plan view of the gripper shown in Figure 2;

Figure 4 is a detail view similar to Figure 3 showing a modified form of gripping lug or projection; and Figures 5 and 6 are details of an adjustable connecting link for the side chains.

The gripper chain comprises a plurality of metallic cross plates or strips 7 which are preferably formed of sheet steel or the like, of suitable composition so that it may be tempered or hardened. These plates have outwardly extending tubular or cylindrical lugs or projections 8 which may be of any desired cross section, either angular or rounded but preferably angular inasmuch as the corners tend to brace or support the adjacent side walls of the projections so that they will not be apt to bend over or turn in. In the form shown in Figures 1 to 3, these plates are provided with two rectangular projections with their sides in alignment with the sides of the tire so that each projection provides two transverse cross pieces 9 and two longitudinal side pieces 10. These hollow projections may be made relatively short so that the wheels will run without undue vibration, such as occurs with ordinary chains. These projections are preferably punched up out of the metal and the inner and outer edges at the ends of the projections are comparatively sharp so that they tend to cut into the ice or other slippery surface and securely gear the wheel thereto so that there will be no sliding or slipping of the wheel on the surface. The projection 11, as shown in Figure 4, is of hollow triangular form which is also considered as being desirable as having the advantages heretofore pointed out. The ends of the strips or cross plates 7 are curved to engage with the special side links 12, the extreme ends of the curved portions being provided with projections 13 which may be bent in to complete the eyes for receiving the sides 14 of the links. In the particular arrangement shown, the plates 7 are bent adjacent to the ends to form sides 14 and 15 so that the strips fit closely over the shouldered tread 16 of the tire 17. By means of this arrangement the strips are held securely against lateral movement on the tire and make the non-skid arrangement more positive in its action.

In order to prevent dirt, ice or the like from accumulating under the strips, the central portions thereof are preferably spaced away from the tread, as shown particularly in Figure 2, so that any ice, mud or the like passing in through the hollow projections may escape through the opening 18 between the plate and the tread. This spacing is accomplished by offsetting or depressing portions of the ends of the cross pieces, as indicated at 19. These depressed end portions are preferably V-shaped on their opposed faces so that the material will tend to pass outwardly along the sides or faces 20 of such V-shaped portions.

The elongated special links 12 have one loop for receiving the ends of the respective cross pieces and another loop as shown at 21 for receiving the connecting chain links 22 which connect the special links around the periphery of the wheel on either side thereof.

While any suitable connecting means may be provided for fastening the ends of the side chains together, I prefer to use an adjustable link or lock such as shown in Figures 5 and 6. This connecting link has an internally threaded section 23 having an eye 24 at one end for engaging with the link 21. The other section 24 has a threaded stem 25 which engages with the threaded section 23 and is held in adjusted position by a lock nut 26. The section or portion 24 has a hook 27 for receiving one of the links 21 which is locked in position by a tongue 28 which is pivoted at 29 in a slot 30. This tongue or locking arm is held in locking position by a spring 31 at the bottom of the slot 30. This arrangement provides a convenient connecting link whereby the ends of the side chains may be readily fastened together and may be adjusted so that the chains and cross members will be held closely against the tire, thereby holding the anti-skid members in their most efficient position and preventing any undue rattling or noise being caused by the gripper chains.

Having thus described my invention, what I claim and desire to secure by Letters Patent is:

1. A one-piece link adapted to extend across a tire and having a plurality of substantially rectangular perforations with projecting flanges around the peripheries thereof, some of said flanges being substantially parallel to the center line of the link and others being transverse thereto whereby the flanges will act squarely to prevent side slipping and also act squarely at times to prevent longitudinal slipping of the wheel.

2. An anti-skid device formed of a single piece of sheet metal adapted to extend across the tread of a tire and having means at the ends thereof for securing the same to supporting chains, said piece having a plurality of integrally formed substantially rectangular projections with openings therethrough, the outer ends of the projections extending beyond the other portions of the piece, some of the walls of the projections being parallel to the line of movement of the tire and other walls of the projections being transverse thereto, substantially as described.

MADS MARTHINSEN.